United States Patent [19]

Gardner

[11] Patent Number: 4,849,602

[45] Date of Patent: Jul. 18, 1989

[54] METHOD FOR FABRICATING CUTTING PIECES

[75] Inventor: Edward R. Gardner, Howell, Mich.

[73] Assignee: Iscar Ltd., Nahariya, Israel

[21] Appl. No.: 231,368

[22] Filed: Aug. 12, 1988

[51] Int. Cl.[4] .............................. B23K 26/00
[52] U.S. Cl. .................... 219/121.71; 76/101 R
[58] Field of Search ............ 219/121.18, 121.19, 219/121.20, 121.39, 121.40, 121.41, 121.67, 121.68, 121.69, 121.70, 121.71, 121.72; 76/101 R, 101 A, DIG. 11, DIG. 12; 407/113, 118, 119

[56] References Cited

U.S. PATENT DOCUMENTS

| | | | |
|---|---|---|---|
| 3,613,485 | 10/1971 | Kelly et al. | 76/101 A |
| 4,328,411 | 5/1982 | Haller et al. | 219/121.18 |
| 4,495,398 | 1/1985 | Bredow et al. | 219/121.67 |
| 4,587,700 | 5/1986 | Curbishley et al. | 219/121.72 X |

Primary Examiner—C. L. Albritton
Attorney, Agent, or Firm—Reising, Ethington, Barnard, Perry & Milton

[57] ABSTRACT

A method for fabricating cutting pieces or inserts wherein a billet (12) is formed by hot pressing of a powder metal, nonmetal, or combination thereof. After the billet has been formed, a series of holes (14) are drilled in a predetermined pattern in the billet (12). Finally, an insert (16) is cut around each of the holes (14) while simultaneously cutting the periphery of the next adjacent insert (16). The holes (14) and inserts (16) are preferably cut by directing a laser beam at the billet (12).

7 Claims, 1 Drawing Sheet

METHOD FOR FABRICATING CUTTING PIECES

TECHNICAL FIELD

The present invention relates to a method for fabricating cutting inserts.

BACKGROUND ART

Fabricating cutting pieces or cutting inserts utilizing powder-metallurgy techniques is well known in the art. Typically, a cutting insert is made by cutting the same out of a stock formed by compaction of a powder metal, nonmetal, or combination thereof. Subsequently, a hole is drilled into the center of each individual insert. The hole is for positively positioning the insert in a machine and locking the same because of the precision needed in such tools. This method is time and labor intensive.

Alternatively, the insert can presently be formed by compacting the powder into the shape of the desired insert and including the hole therein. After compaction, these formed inserts need be machined to form the exact shape necessary for utilization in a milling machine, or the like, resulting in increased processing time and expense.

The U.S. Pat. No. 4,507,536 to Inoue issued Mar. 26, 1985, discloses a method for machining a workpiece. This patent teaches the use of an energy beam to fabricate workpieces such as ceramics.

SUMMARY OF INVENTION AND ADVANTAGES

According to the present invention, there is provided a method for forming cutting inserts. The method comprises steps for forming a billet and drilling a series of holes in a predetermined pattern in the billet. The method further includes the step of cutting an insert in a predetermined pattern around each hole.

Accordingly, there is provided a method wherein several inserts can be cut from a billet. This reduces the waste and process time generated in prior art methods.

FIGURES IN THE DRAWINGS

Other advantages of the present invention will be readily appreciated as the same becomes better understood by reference to the following detailed description when considered in connection with the accompanying drawings wherein:

FIG. 1 is a top plan view of a billet made in accordance with the present invention; and FIG. 2 is a perspective view of an insert made in accordance with the present invention.

DETAILED DESCRIPTION OF THE DRAWINGS

Figure 1:
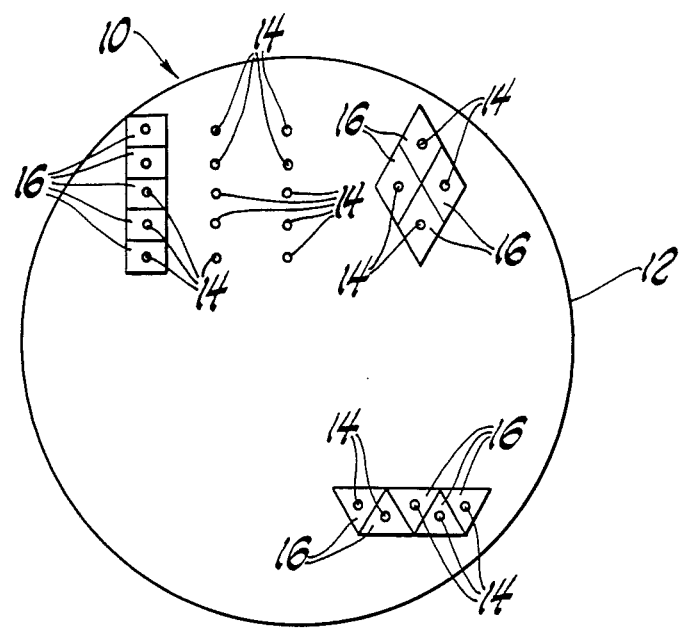
Figure 2:
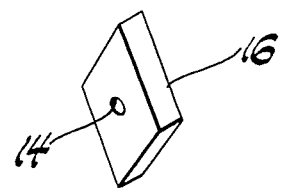

Referring now to FIG. 1, there is generally shown at 10 a top plan view of a billet and cutting inserts 16 to be cut therefrom.

The billet 12 is formed by hot pressing (powder compaction) of a powder metal, nonmetal, or combinations thereof. Preferably, the powder to be used is a ceramic, such as silicon nitride. The billet 12 is preferably formed into a thin portion of a cylinder. That is, the billet 12 is pancake shaped.

Subsequently, a series of holes 14 are drilled in a predetermined pattern in the billet 12. The holes 14 are necessary for positioning and locking the inserts 16 in a turning tool holder or milling cutter or the like. These devices must be very precise so that a part which is made thereon can be made to specification without introducing error from a misaligned insert. Thus, it is imperative that the hole 14 be precisely located within the insert 16. Utilizing a laser to make the holes 14 ensures such precision.

The holes 14 are preferably cut by serially directing a focused beam of energy at a plurality of predetermined positions on the billet 12. Alternatively, the holes 14 may be drilled in the billet 12 utilizing the processes of ultrasonic coring, abrasive slurries, or diamond core drilling After the holes 14 have been drilled in the billet 10, a cutting tool insert 16 is cut around each of the holes 14. That is, each insert 16 is cut in adjacent polygonal shapes with each polygon surrounding a hole 14. It will be appreciated, that a single insert 16 may also be cut around two or more of the holes 14. The inserts 16 may take any of various shapes, but the most common are squares, diamonds, or triangles. The inserts 16 are cut such that the cut made (other than those on the periphery of the billet) will form the sides on two of any adjacent inserts 16. In other words, while an insert 16 is cut around each hole 14, the periphery or side of the next adjacent insert 16 is simultaneously cut; one cut forms the sides of two different inserts 16. This is clearly shown in FIG. 1. This minimizes the handling required for cutting a plurality of inserts 16. The inserts 16 are cut from the billet 12 by directing a focused beam of energy at the billet 12. Alternative techniques, such as utilizing a diamond wheel may be used to cut the inserts 16.

Each edge of the insert 16 comprises a cutting surface. These cutting surfaces are used in milling or turning operations.

To generate a focused beam of energy to cut the holes 14 or inserts 16 a laser is preferably used. To cut the ceramics, which are the preferable material for making the inserts 16, a laser is effective to make a precise cut.

Thus, to make a cutting insert 16 having a hole 14 therein, a billet 12 is formed by compacting powder metal, nonmetal or a combination thereof. A series of holes 14 are drilled in the billet 12 in a predetermined pattern by serially directing a focused beam of energy in the form of a laser beam at a plurality of predetermined positions on the billet 12. Subsequently, an insert 16 is cut around each of the holes 14 by directing a focused beam of energy at the billet 12 and over a predetermined pattern around the holes 14. Some grinding may be necessary after each insert 16 is formed. Processing times are, however, substantially reduced.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method of forming cutting tools comprising the steps of forming a billet (12), drilling a series of holes (14) in a predetermined pattern in the billet (12) and cutting an insert (16) in a predetermined pattern around each hole (14).

2. A method as set forth in claim 1 further characterized by drilling the series of holes (14) in the billet (12) by serially directing a focused beam of energy at a plurality of predetermined positions on the billet (12).

3. A method as set forth in claim 1 further characterized by cutting the inserts (16) by directing a focused beam of energy at the billet (12) and over a predetermined pattern around the holes (14).

4. A method as set forth in either claims 2 or 3 further characterized by utilizing a laser beam as the focused beam of energy.

5. A method as set forth in claim 4 further characterized by hot pressing powder metal, nonmetal or combinations thereof to form the billet (12).

6. A method as set forth in claim 3 further characterized by cutting an insert (16) around each holes (14) by simultaneously cutting the periphery of a next adjacent insert (16).

7. A method as set forth in claim 6 further characterized by cutting the inserts (16) in adjacent polygonal shapes with each polygon surrounding a hole (14).

* * * * *